Aug. 13, 1929.   S. SHAFER, JR   1,724,427
WATER TANK DISCHARGE MECHANISM
Filed Oct. 9, 1926
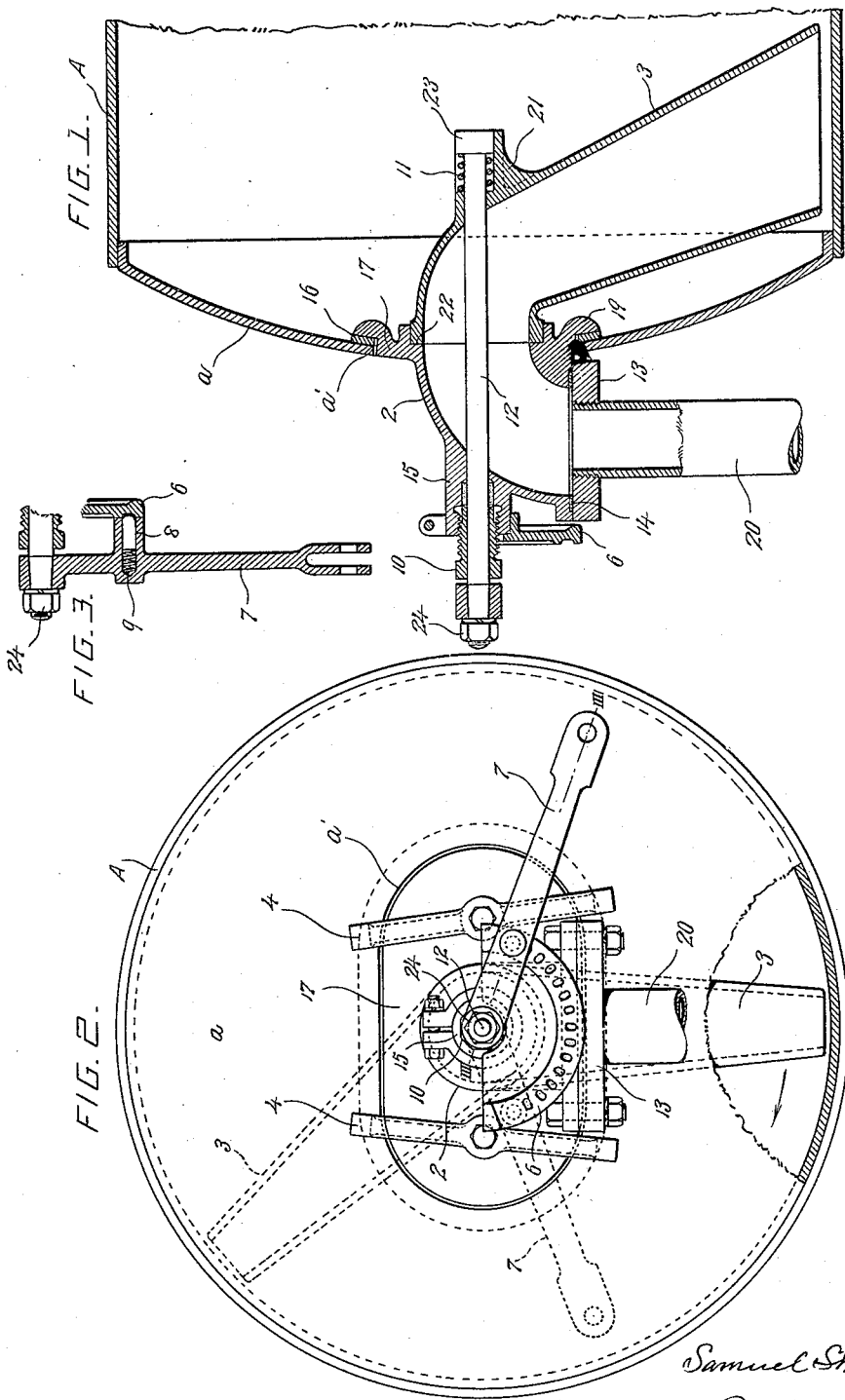

Patented Aug. 13, 1929.

1,724,427

UNITED STATES PATENT OFFICE.

SAMUEL SHAFER, JR., OF MILWAUKEE, WISCONSIN, ASSIGNOR TO CHAIN BELT COMPANY, OF MILWAUKEE, WISCONSIN, A CORPORATION OF WISCONSIN.

WATER-TANK DISCHARGE MECHANISM.

Application filed October 9, 1926. Serial No. 140,535.

My present invention relates to means for controlling the discharge of liquid from a tank or other receptacle by means of an adjustable siphon, and has for its object to improve such mechanisms in certain respects which will be hereinafter pointed out. The invention has been devised with especial reference to use in connection with water tanks for concrete mixing machines, but is not limited to such use.

In the accompanying drawings Fig. 1 is a central, vertical section of apparatus embodying my invention applied to a cylindrical water tank.

Fig. 2 is an end view of the same.

Fig. 3 is a fragmentary detail sectional view taken approximately on the plane indicated by the line III—III of Fig. 2.

Referring to the drawings A designates a liquid receptacle such as a cylindrical water tank for a concrete mixing machine. This tank is represented as having a head $a$, at the center of which is formed an opening $a'$. Into this opening is set a plate 17 adapted to be held in place to close the opening by means of the crabs 4. A suitable gasket 16 lies between an offset flange, 19, of the closing plate and the inner wall of the tank head $a$, thus providing a liquid-tight joint when the plate is properly seated. The closing plate is formed with a hollow elbow 2, preferably integral therewith, constituting part of the discharge conduit leading from the tank. A pipe flange 13 is adapted to cover the outer open end of the elbow 2, to which it is suitably secured, a gasket 14 being arranged between such separable flange and the end of the elbow. There is a screw threaded opening through the flange 13 in which is seated a pipe 20 that serves to conduct the water or other liquid contained in the tank to its place of use, as for instance to the interior of a concrete mixing drum.

3 indicates a siphon elbow located within the tank and communicating with the stationary elbow 2 already described. The outer end of the siphon elbow 3 is of circumferentially cylindrical shape and is rotatable within a seat 22 formed therefor on the inner face of the closing plate 17. The siphon elbow turns with a shaft 12 that is formed with a head 23, that rests in a seat 21 provided therefor and carried by the siphon elbow 3, which seat is preferably integral with the siphon elbow. Near its forward end the shaft passes through a projection 15 that is preferably integral with the elbow 2, and supports a bearing for the shaft, comprising a packing gland 10.

An operating handle 7 is secured fast to the shaft 12. It is provided with a detent, consisting of a plunger 8 that is acted upon by a spring 9, which detent engages with a segmental plate 6, in which are formed a series of depressions into which the detent is forced by the spring, thus serving to maintain the handle 7, and the adjustable siphon elbow 3 in the different positions to which they may be set.

A coiled spring, 11, surrounding the shaft 12 and located between its head 23 and an opposing wall of the seat, 21, operates to hold the detent in working engagement with the segment 6. The shaft 12 may be adjusted longitudinally by means of the nut 24 at its outer end, and thus the tension of the spring, 11, as it acts upon the shaft, can be regulated. The seat for the head, 23, of the shaft, formed in the bearing 21, is of angular shape to fit the head so that the siphon elbow 3 is caused to turn as the shaft is oscillated. The connection of the shaft with the siphon elbow, through its head 23 and the bearing 21, as just described, is easily separable as is apparent from the drawings. It will be seen that the elbows 2 and 3, with the pipe 20 connected with the former, form a siphon opening into the tank, the arm of the siphon within the tank being adjustable so that its open end may be set to one level or another accordingly as the handle 7 is adjusted. This permits the amount of liquid delivered through the siphon from the tank to be determined by the position to which the adjustable elbow 3 is set. For instance, if the parts are adjusted as represented in the drawings practically the entire contents of the tank will be delivered because the open end of the elbow 3 lies near the lowest portion of the tank and the tank must be practically drained before the water column will be broken and flow from the tank stopped. If, however, by adjustment of the handle 7, the inner open end of the elbow 3 be raised from the position indicated in the drawings, the water column will be broken before the tank is fully drained, the amount of liquid drawn off before the flow ceases being determined by the position to which the elbow 3 is set.

The parts of the adjustable tank discharge device described are simple in construction and easily assembled and dissembled; and if any part of the apparatus becomes inoperative through breakage or wear it may be easily discarded and a new part substituted. The parts of the device, being carried by a separable closing plate for the hand hole a' permits of their being assembled and secured to the plate while in the shop, ready to be applied directly, and as a unit, to the tank A whether the latter be in use upon a job or being constructed. By supporting the discharge apparatus in a separable closing plate 17 I am enabled to provide in the head a of the tank an opening for cleaning out or other purposes of ample size.

What I claim is:

1. The combination of a tank having a discharge opening, a siphon for controlling the discharge from the tank comprising a tubular elbow within the tank, one end of which is rotatably mounted in a seat concentric with the discharge opening, a shaft rotatably supported in a stationary bearing carried by the tank having a connection with the adjustable elbow so that oscillation of the shaft turns the elbow in its seat, means by which the shaft may be turned and a spring acting on both the shaft and the adjustable elbow to hold the latter against the seat in which it turns.

2. The combination with a liquid holding tank, of a discharge conduit leading therefrom, a syphoning elbow located within the tank having a connection with the discharge conduit permitting it to be axially adjusted, the elbow being formed with an angular seat, a shaft by which the elbow is rotatively adjusted, having at its inner end a head that fits the seat carried by the elbow, a bearing for the shaft outside the tank and a spring surrounding the shaft, located in the said seat between the head of the shaft and the wall of the seat.

SAMUEL SHAFER, Jr.